United States Patent [19]
Oikawa et al.

[11] Patent Number: 6,133,331
[45] Date of Patent: Oct. 17, 2000

[54] EXPANDED PARTICLES OF POLYOLEFIN RESIN AND PROCESS FOR PREPARING THE SAME

[75] Inventors: Masaharu Oikawa, Shimotsuka-gun; Kazuo Tsurugai; Hisao Tokoro, both of Utsunomiya, all of Japan

[73] Assignee: JSP Corporation, Tokyo, Japan

[21] Appl. No.: 09/125,272

[22] PCT Filed: Jun. 11, 1997

[86] PCT No.: PCT/JP97/02022

§ 371 Date: Aug. 13, 1998

§ 102(e) Date: Aug. 13, 1998

[87] PCT Pub. No.: WO98/25996

PCT Pub. Date: Jun. 18, 1998

[30] Foreign Application Priority Data

Dec. 13, 1996 [JP] Japan ................................ 8-352771

[51] Int. Cl.$^7$ ........................................ C08J 9/18
[52] U.S. Cl. ........................ 521/60; 521/56; 521/79; 521/85; 521/123; 521/143
[58] Field of Search ................. 521/56, 143, 60, 521/79, 85, 123

[56] References Cited

U.S. PATENT DOCUMENTS

| | | |
|---|---|---|
| Re. 32,780 | 11/1988 | Yoshimura et al. . |
| 4,379,859 | 4/1983 | Hirosawa et al. . |
| 4,436,840 | 3/1984 | Akiyama et al. . |
| 4,440,703 | 4/1984 | Akiyama et al. . |
| 4,443,393 | 4/1984 | Akiyama et al. . |
| 4,464,484 | 8/1984 | Yoshimura et al. . |
| 4,504,534 | 3/1985 | Adachi et al. . |
| 4,504,601 | 3/1985 | Kuwabara et al. . |
| 4,567,208 | 1/1986 | Kuwabara et al. . |
| 4,568,608 | 2/1986 | Kuwabara et al. . |
| 4,587,270 | 5/1986 | Kuwabara et al. . |
| 4,598,001 | 7/1986 | Watanabe et al. . |
| 4,602,082 | 7/1986 | Akiyama et al. . |
| 4,676,939 | 6/1987 | Kuwabara . |
| 4,692,507 | 9/1987 | Akiyama et al. . |
| 4,695,593 | 9/1987 | Kuwabara et al. . |
| 4,704,239 | 11/1987 | Yoshimura et al. . |
| 4,711,287 | 12/1987 | Kuwabara et al. . |
| 4,716,021 | 12/1987 | Akiyama et al. . |
| 4,749,725 | 6/1988 | Akiyama et al. . |
| 4,756,948 | 7/1988 | Kuramochi et al. . |
| 4,777,000 | 10/1988 | Kuwabara et al. . |
| 4,822,542 | 4/1989 | Kuwabara et al. . |
| 4,840,973 | 6/1989 | Kuwabara et al. . |
| 4,867,923 | 9/1989 | Topcik et al. ............................. 264/54 |
| 4,889,671 | 12/1989 | Akiyama et al. . |
| 4,948,817 | 8/1990 | Kuwabara et al. . |
| 5,053,435 | 10/1991 | Kuwabara et al. . |
| 5,071,883 | 12/1991 | Kuwabara et al. . |
| 5,084,814 | 1/1992 | Vaglica et al. . |
| 5,085,814 | 2/1992 | Kamiyama et al. . |
| 5,122,545 | 6/1992 | Kuwabara et al. . |
| 5,130,341 | 7/1992 | Kuwabara et al. . |
| 5,284,431 | 2/1994 | Kuwabara et al. . |
| 5,340,841 | 8/1994 | Tokoro et al. . |
| 5,391,581 | 2/1995 | Kuwabara et al. . |
| 5,459,169 | 10/1995 | Tokoro et al. . |
| 5,569,681 | 10/1996 | Tokoro et al. . |
| 5,622,756 | 4/1997 | Tokoro et al. . |
| 5,651,912 | 7/1997 | Mitsumoto et al. . |
| 5,679,450 | 10/1997 | Tokoro et al. . |
| 5,747,549 | 5/1998 | Tsurugai et al. . |

FOREIGN PATENT DOCUMENTS

| | | |
|---|---|---|
| 0068467 | 1/1983 | European Pat. Off. . |
| 0071981 | 2/1983 | European Pat. Off. . |
| 57-195131 | 11/1981 | Japan . |
| 58-051123 | 3/1983 | Japan . |

*Primary Examiner*—John M. Cooney, Jr.

[57] ABSTRACT

When it is intended to obtain foamed particles having a high expansion ratio upon the production of foamed particles of a polyolefin resin, there has been a problem that foamed particles uneven in cell diameter are produced. Any molded article produced with such foamed particles has involved a drawback that it is poor in dimensional stability, and its surface profile becomes uneven.

The invention relates to foamed particles comprising a polyolefin resin as a base resin, wherein the base resin contains a metal salt (excluding alkali metal salts) of boric acid in such a manner that the content of the metal salt of boric acid in the raw resin amounts to 50–50,000 ppm. Zinc borate, magnesium borate or the like is used as the metal salt of boric acid.

The foamed particles are obtained by using a polyolefin resin containing the metal salt of boric acid to prepare resin particles, dispersing the resin particles in a dispersion medium in a closed vessel and at the same time impregnating the resin particles with a foaming agent, holding the resin particles in a heated and pressurized atmosphere, and then releasing the resin particles together with the dispersion medium into an atmosphere of a pressure lower than the internal pressure of the vessel to expand the resin particles.

11 Claims, 1 Drawing Sheet

EXPANDED PARTICLES OF POLYOLEFIN RESIN AND PROCESS FOR PREPARING THE SAME

TECHNICAL FIELD

The present invention relates to foamed particles of a polyolefin resin, which are suitable for use as a raw material for molding, or the like, and a production process thereof.

BACKGROUND ART

As a process for obtaining expansion-molded articles of plastics, Japanese Patent Application Laid-Open Nos. 195131/1982 and 51123/1983 each disclose a process in which foamed particles are filled into a mold and then heated to fusion-bond the particles to one another, thereby producing a molded article in a desired shape. As a process for producing foamed particles used in molding, Japanese Patent Application Laid-Open Nos. 4738/1986 and 223347/1991 each disclose a process in which particles of a polyolefin resin are impregnated with a volatile organic foaming agent or an inorganic gas type foaming agent in a state that the particles have been dispersed in an aqueous medium in a vessel, the impregnated particles are heated to a temperature not lower than the foaming temperature of the resin while maintaining the internal pressure of the vessel at the vapor pressure of the foaming agent or higher, and the particles are then released from the vessel into an atmosphere of a pressure lower than the internal pressure of the vessel, thereby expanding the particles.

When an inorganic gas type foaming agent is used as the foaming agent, however, it is generally difficult to provide foamed particles having a high expansion ratio. As disclosed in Japanese Patent Application Laid-Open Nos. 4738/1986 and 223347/1991, it has been known to add aluminum hydroxide or borax to a base resin to produce foamed particles in order to enhance the expansion ratio of the resulting foamed particles. However, such foamed particle have involved a problem that when a molded article is produced with the foamed particles, the resulting molded article undergoes significant shrinkage upon molding and the dimensional stability of the molded article is thus deteriorated. Such foamed particles have also involved a drawback that their cells become larger or smaller than they need, so that the cell size varies widely, and this scattering of the cells comes out on the surface of the resulting molded article to impair the appearance of the molded article. More specifically, the regular fusion-bonded state of foamed particles generally appears on the outer surface of an expansion-molded article. However, an irregular fusion-bonded state appears on a molded article obtained by molding foamed articles of uneven cell diameters, so that regularities arise in the external appearance of the molded article. In particular, when cells in foamed particles are significantly fined, such foamed particles are whitened. When such whitened foamed particles are mixed into a raw material for molding, the external appearance of the resulting molded article becomes significantly uneven (irregular), resulting in reduction in its commercial value.

Besides, when carbon black or another coloring pigment is added to foamed particles in advance to color foamed particles, their color looks thin at portions where cells are fine, and thick at portions where cells are large. Therefore, when a molded article has been produced by using, as a raw material, such foamed particles of uneven cell diameters, there has been a drawback that color irregularity markedly occurs on the surface of the molded article to impair the external appearance of the molded article, and so its commercial value is likewise reduced.

It is an object of the present invention to provide foamed particles of a polyolefin resin, which have a high expansion ratio and are free of scatter of cell diameters.

Another object of the present invention is to provide foamed particles of a polyolefin resin as a raw material for molding, from which molded articles undergoing little shrinkage upon molding and hence having excellent dimensional stability can be provided.

A further object of the present invention is to provide foamed particles of a polyolefin resin, from which molded articles exhibiting a regular fusion-bonded state of the foamed particles and having a uniform external appearance can be produced.

A still further object of the present invention is to provide a process of producing foamed particles of a polyolefin resin, by which the above-described foamed particles of the polyolefin resin can be produced with ease.

DISCLOSURE OF THE INVENTION

The present invention is directed to foamed particles of a polyolefin resin, which comprise a base resin and a metal salt (excluding any alkali metal salt) of boric acid contained therein. A polyolefin resin may be used as the base resin, and zinc borate, magnesium borate or the like may be used as the metal salt of boric acid. In the present invention, however, alkali metal salts of boric acid must be excluded. For example, sodium borate and potassium borate can not be used in the present invention.

The content of the metal salt of boric acid in the base resin may preferably be 50–50,000 ppm.

In order to produce the foamed particle of the polyolefin resin according to the present invention, resin particles obtained by containing the metal salt of boric acid in a base resin are dispersed together with a foaming agent in a dispersion medium such as water to impregnate the resin particles with the foaming agent, the interior of a vessel containing the dispersion is heated to a predetermined temperature, and the foamable resin particles and the dispersion medium are released from the vessel into an atmosphere of a pressure lower than the internal pressure of the vessel, thereby obtaining foamed particles expanded at a high ratio.

The foamed particles according to the present invention may also be produced by another production process, for example, an extrusion expansion process. This extrusion expansion process is a process in which a base resin containing the metal salt of boric acid is melted and kneaded together with a foaming agent in an extruder, the melt is then extruded and expanded in the form of a strand, and the strand is then chopped to obtain foamed particles.

Since the foamed particles according to the present invention are produced with the base resin containing the metal salt (excluding any alkali metal salt) of boric acid, the foamed particles can be provided as foamed particles having a high expansion ratio. Even when, for example, an inorganic gas type foaming agent is used as the foaming agent upon the production of the foamed particles according to the present invention, foamed particles having a high expansion ratio can be provided. In addition, the foamed particles according to the present invention are uniform in cell diameter while having a high expansion ratio.

When the foamed particles according to the present invention are used as a raw material for molding to produce an expansion-molded article, a good molded article can be provided. More specifically, the resultant molded article has features that the shrinkage factor is low, the dimensional stability is excellent, and moreover the fusion-bonded state of the foamed particles coming out on the outer surface of the molded article is regular, and so good surface profile is achieved. The molded article having good appearance can enhance its commercial value.

Since the foamed particles according to the present invention are uniform in cell diameter, they can be evenly colored when carbon black or a pigment is added thereto. Accordingly, when molding is performed with the colored foamed particles according to the present invention, a molded article having a good external appearance in that it is free of any color irregularity and hence has an evenly colored surface can be provided.

According to the production process of foamed particles of the present invention, foamed particles of a polyolefin resin having a high expansion ratio can be produced with ease.

According to the present invention, foamed particles having a high expansion ratio can be obtained by using a resin containing the metal salt of boric acid as a raw material for producing foamed particles. Therefore, there is no need to use a large amount of a foaming agent, and so the amount of the foaming agent to be used can be reduced. As a result, it is also possible to use a pressure vessel lower in pressure resistance than a pressure vessel heretofore in use because the pressure within the pressure vessel upon expansion is reduced. Therefore, the present invention can contribute to reduction in production cost.

According to the present invention, it is possible to use an inorganic gas type foaming agent as the foaming agent when the foamed particles high in expansion ratio and uniform in cell diameter are provided. The use of the inorganic gas type foaming agent permits the reduction of production cost, involves no problem of environmental pollution and is safe even from the viewpoint of handling.

Besides, even when the equilibrium vapor pressure within a pressure vessel is preset lower to obtain foamed particles having a low expansion ratio (2–10 times), the present invention has an effect that uniform foamed particles narrow in scatter of expansion ratios can be obtained.

BEST MODE FOR CARRYING OUT THE INVENTION

Figure 1:
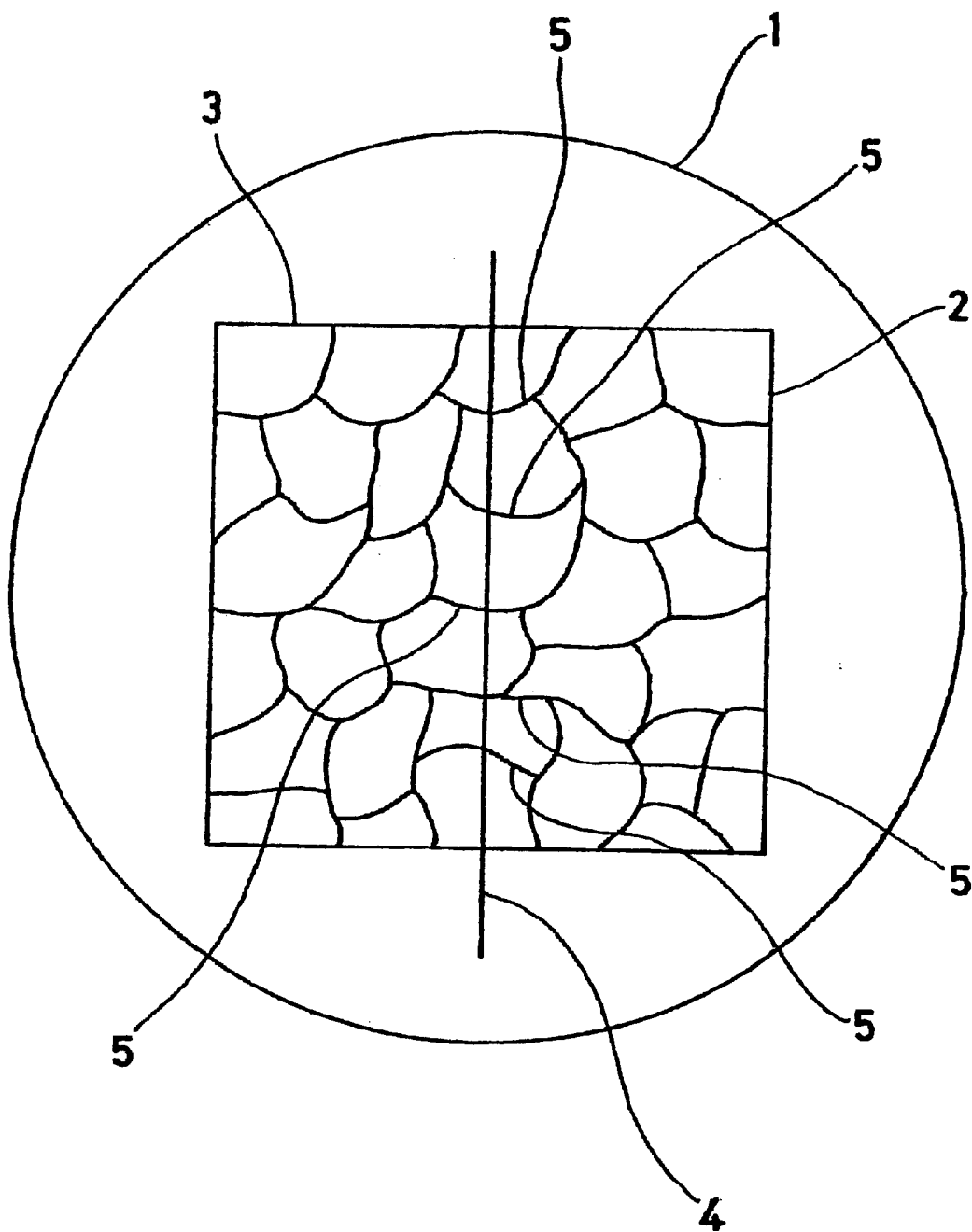
FIG. 1 is an explanatory drawing illustrating how to measure an average cell diameter of a foamed particle at its cut surface.

The present invention will hereinafter be described in detail. Illustrative examples of a base resin for the resin particles useful in the practice of the present invention include resins, such as propylene homopolymers, propylene-based copolymers such as propylene-ethylene random copolymers, propylene-ethylene block copolymers, propylene-butene random copolymers and propylene-ethylene-butene random copolymers, high-density polyethylene, and ethylene-based copolymers such as linear low-density polyethylenes which are ethylene-α-olefin copolymers, and ethylene-vinyl acetate copolymers. These polymers may or may not be crosslinked.

The metal salt of boric acid useful in the practice of the present invention is a compound represented by the following general formula (1) or (2):

$$_xM_2O \cdot _yB_2O_3 \cdot _zH_2O \tag{1}$$

wherein x and y are independently an integer of 1 or more, z is a number of 0 or more, and M means a monovalent metal element.

$$_xMO \cdot _yB_2O_3 \cdot _zH_2O \tag{2}$$

wherein x and y are independently an integer of 1 or more, z is a number of 0 or more, and M means a divalent metal element.

The metal salts of boric acid represented by the above formulae exclude alkali metal salts such as sodium borate, potassium borate and lithium borate. Namely, the alkali metals as used herein mean Li, Na, K, Rb, Cs and Fr.

When an alkali metal salt of boric acid is used, the expansion ratio of the resulting foamed particles is enhanced, but the scatter of cell diameters becomes wide, and the shrinkage factor of a molded article produced by using such foamed particles as a raw material becomes high, and so such a molded article has poor dimensional stability. In particular, when a salt having high hygroscopicity, such as borax ($Na_2B_4O_7 \cdot 10H_2O$), is used as the alkali metal salt of boric acid, the metal salt of boric acid added to the base resin absorbs moisture in the air, and cells are formed upon production of resin particles from such a base resin, so that there is a possibility that formation of resin particles may become unstable, or large cells may be formed upon production of foamed particles, and cell diameters may vary widely.

Examples of the metal salt used in the present invention include zinc borate and magnesium borate, with zinc borate being particularly preferred. In the present invention, these metal salts of boric acid may be used either singly or in any combination thereof.

Examples of zinc borate include zinc metaborate [$Zn(BO_2)_2$], basic zinc borate [$ZnB_4O_7 \cdot 2ZnO$] and those represented by chemical formulas of $2ZnO \cdot 3B_2O_3 \cdot 3.5H_2O$, $3ZnO \cdot 2B_2O_3 \cdot 5H_2O$ and the like.

Examples of magnesium borate used in the present invention include magnesium orthoborate [$Mg_3(BO_3)_2$], magnesium diborate, magnesium pyroborate [$Mg_2B_2O_3$ or $2MgO \cdot B_2O_3$], magnesium metaborate [$MgO \cdot B_2O_3$], trimagnesium tetraborate [$Mg_3B_4O_9$ or $3MgO \cdot 2B_2O_3$], tetramagnesium pentaborate [$Mg_5B_4O_{11}$], magnesium hexaborate [$MgB_6O_{10}$] and those represented by chemical formulae of $2MgO \cdot 3B_2O_3 \cdot nH_2O$ (wherein n is a positive integer), $MgO \cdot 4B_2O_3 \cdot 3H_2O$, $MgO \cdot 6B_2O_3 \cdot 18H_2O$ and the like.

Among these metal salts of boric acid, the zinc borates represented by the chemical formulae of $2ZnO \cdot 3B_2O_3 \cdot 3.5H_2O$, $3ZnO \cdot 2B_2O_3 \cdot 5H_2O$ and the like are particularly effective.

It is preferred that the particle size of the metal salt of boric acid be generally 0.1–100 μm, particularly 0.5–50 μm. If the particle size of the metal salt of boric acid is smaller than 0.1 μm, the cells in the resulting foamed particles tend to become too fine, so that such foamed particles are deteriorated in secondary expandability upon production of a molded article therefrom. If the particle size is greater than 100 μm, it is difficult to sufficiently achieve the expansion ratio-enhancing effect, and cells in the resulting foamed particles tend to become coarse.

The cell diameter of the foamed particles according to the present invention is preferably within a range of 50–500 μm, more preferably 150–300 μm in terms of average cell diameter.

When the metal salt of boric acid is contained in the base resin of the foamed particles, the expansion ratio of the resultant foamed particles can be enhanced while keeping their cell diameters uniform. The content of the metal salt of boric acid in the base resin of the foamed particles is preferably 50–50,000 ppm by weight, particularly 100–5,000 ppm by weight. If the content of the metal salt of boric acid is lower than 50 ppm, it is impossible to prevent scattering of cell diameters in the resulting foamed particles. On the other hand, any content exceeding 50,000 ppm results in foamed particles liable to shrink, and moreover cells in the foamed particles show a strong tendency to become open cells, so that there is a possibility that the moldability of the foamed particles may be deteriorated.

The metal salt of boric acid is generally added to the base resin as a raw material before resin particles are produced by using the base resin. As a process for producing the resin particles, there may be used any conventionally known method, such as a process in which the base resin is melted and kneaded in an extruder, the melt is extruded in the form of a strand, and the strand is quenched in water and then chopped.

In order to add the metal salt of boric acid to the base resin, there is generally used a process in which the metal salt of boric acid is mixed with a polyolefin resin in such a manner that the concentration of the salt amounts to 5–200 times as much as the final amount to be added, thereby preparing a master batch, and this master batch is added to the base resin. However, the metal salt of boric acid may be directly added in the form of powder to the base resin.

When the foamed particles of the polyolefin resin according to the present invention are produced, the resin particles obtained by containing the metal salt of boric acid in the base resin as described above are dispersed in a dispersion medium in a closed vessel to impregnate the resin particles with a foaming agent while pressurizing, heating and stirring the dispersion. After the interior of the vessel is then heated to a predetermined temperature, the foamable resin particles impregnated with the foaming agent and the dispersion medium are released from the vessel into an atmosphere of a pressure lower than the internal pressure of the vessel, thereby expanding the resin particles.

As the dispersion medium dispersing the resin particles therein, there may be used any medium, which does not dissolve the resin particles therein, such as water, an alcohol, a glycol or glycerol. However, water is generally used.

An anti-fusing agent may be added to the dispersion medium upon dispersing the resin particles, the foaming agent and the like therein for the purpose of preventing fusion bonding among the resin particles by heating upon the dispersion or heating in a subsequent expansion step. Any anti-fusing agent may be used as such an anti-fusing agent, irrespective of organic and inorganic agents so far as it neither dissolves in the dispersion medium nor melts upon heating. However, an inorganic anti-fusing agents is generally used. Preferable examples of the inorganic anti-fusing agent include powders of mica, kaolin, aluminum oxide, titanium oxide, aluminum hydroxide and the like. The average particle size of the anti-fusing agent is preferably 0.001–100 µm, particularly 0.001–30 µm.

When the anti-fusing agent is used, an anionic surfactant such as sodium dodecylbenzenesulfonate, sodium alkylsulfonate or sodium oleate is preferably used as a dispersion aid in combination. It is preferred that the anti-fusing agent and the dispersion aid be added in proportions of about 0.01–2 parts by weight and about 0.001–1 part by weight, respectively, per 100 parts by weight of the resin particles.

Examples of the foaming agent used in expanding the resin particles include inorganic gases and volatile organic foaming agents. Examples of the inorganic gases include carbon dioxide, air, nitrogen, helium and argon. On the other hand, examples of the volatile organic foaming agents include aliphatic hydrocarbons such as propane, butane and hexane, alicyclic hydrocarbons such as cyclobutane and cyclohexane, and halogenated hydrocarbons such as chlorofluoromethane, trifluoromethane, 1,1-difluoroethane, 1-chloro-1,1-difluoroethane, 1,2,2,2-tetrafluoroethane, 1-chloro-1,2,2,2-tetrafluoroethane, methyl chloride, ethyl chloride and methylene chloride.

The above-mentioned foaming agents may be used either singly or in any combination thereof. Besides, a volatile organic foaming agent and an inorganic gas may be used in combination. In view of the fact that many of compounds used as the volatile organic foaming agents have risks such as toxicity and combustibility, or cause ozonosphere destruction or environmental pollution, and those hard to cause these problems are expensive and hence unpractical, it is preferable to use the inorganic gases.

When an inorganic gas is used as the foaming agent, it is preferable to add the foaming agent in such a manner that the equilibrium vapor pressure within the closed vessel right before initiation of expansion amounts to 5–60 kgf/cm$^2$G. When a volatile organic foaming agent is used as the foaming agent, it is preferable to add the foaming agent so as to account for 5–30 parts by weight per 100 parts by weight of the resin particles.

After impregnating the resin particles with the foaming agent as described above, the closed vessel is opened at one end thereof to release the resin particles and the dispersion medium from the vessel into an atmosphere of a pressure lower than the internal pressure of the vessel, generally, under atmospheric pressure, whereby the resin particles can be expanded to obtain foamed particles. At this time, it is preferred that the internal pressure of the vessel be at least 5 atm, and the internal temperature of the vessel be from [the melting point of the resin −10° C.] to [the melting point of the resin +10° C.].

In the present invention, the melting point of the resin means the melting point of the base resin of the resin particles and is determined in the following manner.

Namely, a temperature corresponding to a top of an endothermic peak (an inherent peak) on a DSC curve obtained by heating about 6 mg of a sample (resin particles) to 220° C. at a heating rate of 10° C./min by a differential scanning calorimeter, cooling the sample down to about 50° C. at a cooling rate of 10° C./min and then heating it again to 220° C. at a heating rate of 10° C./min is determined as the melting point of the resin.

Other processes for obtaining the foamed particles of the polyolefin resin according to the present invention include known processes such as a process in which the base resin containing the metal salt of boric acid is melted and kneaded together with the foaming agent in an extruder, the melt is then extruded and expanded in the form of a strand, and the strand is then chopped to obtain the foamed particles, and a process in which the base resin containing the metal salt of boric acid is impregnated with the foaming agent in a closed vessel to prepare foamable resin particles, and the foamable resin particles are then heated by applying steam or heated air of high temperature to expand them.

According to the present invention, foamed particles having a high expansion ratio can be obtained. For example, foamed particles having an expansion ratio of 5–50 times can be obtained with ease.

Incidentally, the foamed particles of the polyolefin resin obtained in accordance with such a process of the present invention as described above can be converted into foamed particles having a higher expansion ratio by aging them under an atmospheric pressure, subjecting them to a pressurizing treatment under pressurized air to apply an internal pressure thereto and then heating them with steam or heated air (this process will hereinafter be referred to as two-stage expansion).

The foamed particles obtained in accordance with the process of the present invention are filled into a mold and then heated with steam or the like, whereby the foamed particles can be mutually fusion-bonded to obtain a molded particle in the desired form conforming with the mold.

The present invention will hereinafter be described in detail by the following specific examples.

EXAMPLES 1–7, COMPARATIVE EXAMPLES 1–6

As a base resin, the following ethylene-propylene random copolymer was used.

Ethylene-propylene random copolymer:
① Ethylene content: 2.3 wt. %
② Melting point: 146° C.
③ Melt flow rate measured under Conditions 14 shown in Table 1 of JIS K 7210 : MFR=10 g/10 min.

The ethylene-propylene random copolymer of the base resin and their corresponding additives shown in Table 1 were separately melted and kneaded in a pressure kneader to prepare respective master batches. As zinc borate, there was used Zinc Borate 2335 produced by Tomita Pharmaceutical Co. Ltd. Each of the master batches and the base resin were blended, melted and kneaded in an extruder in such a manner that the content of the additive in the base resin amounted to its corresponding content shown in Table 1, and the resultant melt was then extruded into a strand. The strand was quenched in water and then chopped by a pelletizer, thereby forming pellets (resin particles) having an average weight of 2 mg/pellet.

In an autoclave, 0.3 parts by weight of kaolin as a dispersing agent, 0.006 parts by weight of sodium dodecylbenzenesulfonate as an emulsifier and 100 parts by weight of the resin particles were dispersed together with its corresponding foaming agent shown in Table 1 in 300 parts by weight of water. After the dispersion was heated to its corresponding foaming temperature shown in Table 1 with stirring and held for a fixed period of time, the vessel was opened at one end thereof to release the resin particles and water at the same time in a state that the closed vessel was kept at a pressure equal to the equilibrium vapor pressure therein, thereby expanding the resin particles to obtain foamed particles. After the thus-obtained foamed particles in each example were subjected to a predetermined aging process, their expansion ratio and average cell diameter were measured, and moreover the uniformity of cells was observed. The results are shown in Table 1.

Incidentally, the predetermined aging process is as follows.

In each of Examples 1, 2, 4 and 5, and Comparative Examples 2, 3 and 4, the thus-obtained foamed particles were allowed to stand for 24 hours at ordinary temperature and atmospheric pressure, then for 24 hours at ordinary temperature under pressurized air of 2 kgf/cm²G, and then for 24 hours at ordinary temperature and atmospheric pressure to conform the internal pressure of the foamed particle to the atmospheric pressure, thereby completing the aging process.

In each of Examples 3, 6 and 7, and Comparative Examples 1, 5 and 6, the thus-obtained foamed particles were allowed to stand for 24 hours at ordinary temperature and atmospheric pressure to conform the internal pressure of the foamed particle to the atmospheric pressure, thereby completing the aging process.

Each foamed particle sample subjected to the aging process was filled into a mold having inside dimensions of 300 mm×300 mm×60 mm, preheated with steam and then heated with steam of its corresponding steam pressure (in Table 1, expressed as "Steam pressure upon molding") shown in Table 1 to expand and mold the foamed particle sample, thereby obtaining a molded article. In the preheating, steam within a range of [the steam pressure upon molding–0.8 kgf/cm²G] to [the steam pressure upon molding–0.4 kgf/cm²G] was used. The thus-obtained molded article was aged for 24 hours at 60° C. and atmospheric pressure.

The dimensional stability of the thus-obtained molded articles were determined, and moreover uniformity of their appearances was observed. The results are shown in Table 1.

EXAMPLES 8–10, COMPARATIVE EXAMPLES 7–9

The same base resin as that used in Examples 1–7 and their corresponding additives shown in Table 2 were separately melted and kneaded in a pressure kneader to prepare respective master batches. The same zinc borate as that used in Examples 1–7 was used as zinc borate. Each of the master batches and the base resin were blended in an extruder in such a manner that the content of the additive in the base resin amounted to its corresponding content shown in Table 2, thereby obtaining pellets (resin particles) having an average weight of 2 mg/pellet in the same manner as in the above-described Examples and Comparative Examples.

In a similar manner to the above-described Examples and Comparative Examples, an autoclave was charged with the resin particles, a foaming agent, water, etc. to expand the resin particles under its corresponding expansion conditions shown in Table 2, thereby obtaining foamed particles (hereinafter referred to as "primary foamed particles"). After the thus-obtained primary foamed particles in each example were allowed to stand for 24 hours at ordinary temperature and atmospheric pressure, the expansion ratio of the primary foamed particles was measured. The results are shown in Table 2.

After its corresponding internal pressure shown in Table 3 was applied to the primary foamed particles after left over for 24 hours under atmospheric pressure using pressurized air at ordinary temperature, the thus-treated foamed particles were heated with steam under its corresponding steam pressure (column of Two-stage expansion conditions in Table 3) shown in Table 3 while stirring them in a pressure vessel, thereby producing foamed particle (hereinafter referred to as "secondary foamed particles") having a higher expansion ratio.

After the thus-obtained secondary foamed particles in each example were allowed to stand for 24 hours at ordinary temperature and atmospheric pressure, their expansion ratio and average cell diameter were measured, and moreover the uniformity of cells was observed. The results are shown in Table 3.

After an internal pressure of 1.4 kgf/cm²G was applied to the secondary foamed particles after left over for 24 hours under atmospheric pressure using pressurized air at ordinary temperature, they were immediately filled into the same mold as that used in the above-described Examples and Comparative Examples, preheated similarly and then heated with steam of its corresponding steam pressure upon molding shown in Table 3 to expand and mold the secondary foamed particles, thereby obtaining a molded article.

After the thus-obtained molded article was aged for 24 hours at 60° C. and atmospheric pressure, the dimensional stability of the molded article was determined, and moreover uniformity of its appearance was observed. The results are shown in Table 3.

In each of the above-described Examples 1–7, Comparative Examples 1–6, and Examples 8–10, Comparative Examples 7–9, the expansion ratio, average cell diameter, uniformity of cells, dimensional stability of the molded article and uniformity of its appearance were determined in the following manner:

(1) Expansion Ratio:

The expansion ratio was calculated in accordance with the following equation:

Expansion ratio=True density (g/cm$^3$) of base resin/Bulk density (g/cm$^3$) of foamed particles.

Incidental the bulk density of the foamed particles in each example is determined in the following manner. A container having a volume of 1,000 cm$^3$ and an opening at its top is provided. A foamed particle sample is filled into the container to remove foamed particle portions beyond the opening of the container, thereby substantially conforming the bulk height of the foamed particle sample to the opening of the container. The weight (g) of the foamed particle sample within the container at this time is divided by 1,000 cm$^3$.

(2) Average Cell Diameter:

Twenty foamed particles were cut at their centers to observe their sections through a microscope of 50 magnifications. With respect to each foamed particle, a square range 2 of 2 mm×2 mm in size was defined in the cut surface of the foamed particle 1 as illustrated in FIG. 1. A line 4 that intersected the substantial center of an optional side 3 of the square and was perpendicular to the side 3 was drawn to count the number N (membranes) of cell membranes 5 within the square range 2 in the cut surface, which were crossed by this line 4, thereby calculating the average cell diameter in the cut surface of the foamed particle in accordance with the following equation (3):

Average cell diameter=2000/(N+1)  (3)

(3) Uniformity of cells:

The uniformity of cells in each foamed particle sample was evaluated in the following standard:

◯ . . . With respect to each of the foamed particles observed, cells observed in the cut surface vary little in size, and those having an average cell diameter smaller than two third of the average value of the average cell diameters of the twenty foamed particles observed are fewer than three among the foamed particles observed.

X . . . With respect to each of the foamed particles observed, cells observed in the cut surface vary in size, or those having an average cell diameter smaller than two third of the average value of the average cell diameters of the twenty foamed particles observed are not fewer than three among the foamed particles observed.

(4) Dimensional Stability of Molded Article:

With respect to 4 sides of one surface of surfaces of each molded article sample aged at 60° C. for 1 day, said surfaces corresponding to the mold inside dimensions (300 mm×300 mm), the lengths of lines connecting middle points of opposite sides were separately measured to calculate their average length A (mm), thereby determining a shrinkage factor of the molded article by substituting this value in the following equation (4):

Shrinkage factor(%)=[(300−A)/300 ]×100  (4.)

The dimensional stability of the molded article was evaluated in accordance with the following standard:

◯. . . The shrinkage factor is lower than 2.7%

X . . . The shrinkage factor is not lower than 2.7%.

(5) Uniformity of Appearance of Molded Article:

The surface of each molded article sample was visually observed to evaluate the uniformity of its appearance in accordance with the following standard:

◯. . . Irregularities are scarcely observed on the external appearance of the molded article.

◯. . . Irregularities are observed on the external appearance of the molded article.

TABLE 1

| | | | Expansion conditions | | | Foamed particles | | | Steam pressure | Molded article | |
|---|---|---|---|---|---|---|---|---|---|---|---|
| | Additive | Content of additive (ppm) | Foaming agent | Amount of foaming agent (parts by weight) | Foaming temp. (° C.) | Equilibrium vapor pressure (kgf/cm$^2$G) | Expansion ratio | Average cell diameter (μm) | Uniformity of cells | upon molding (kgf/cm$^2$G) | Dimensional stability | Uniformity of appearance |
| Ex. 1 | Zinc borate | 1000 | CO$_2$ | 9.0 | 150.0 | 45 | 42 | 92 | ◯ | 2.6 | ◯ | ◯ |
| Ex. 2 | Zinc borate | 1000 | CO$_2$ | 7.5 | 151.0 | 35 | 32 | 130 | ◯ | 2.8 | ◯ | ◯ |
| Ex. 3 | Zinc borate | 1000 | CO$_2$ | 5.0 | 151.5 | 25 | 17 | 200 | ◯ | 3.4 | ◯ | ◯ |
| Ex. 4 | Zinc borate | 500 | CO$_2$ | 9.0 | 151.0 | 45 | 34 | 140 | ◯ | 2.8 | ◯ | ◯ |
| Ex. 5 | Zinc borate | 2000 | CO$_2$ | 9.0 | 151.5 | 45 | 45 | 120 | ◯ | 2.6 | ◯ | ◯ |
| Ex. 6 | Zinc borate | 1000 | Air | — | 153.0 | 40 | 18 | 170 | ◯ | 3.4 | ◯ | ◯ |
| Ex. 7 | Zinc borate | 1000 | Air | — | 153.5 | 10 | 7 | 200 | ◯ | 3.8 | ◯ | ◯ |
| Comp. Ex. 1 | hydroxide | 1000 | CO$_2$ | 8.5 | 150.0 | 40 | 23 | 120 | × | 3.2 | ◯ | × |
| Comp. Ex. 2 | Borax | 1000 | CO$_2$ | 9.0 | 150.5 | 45 | 45 | 240 | × | 2.6 | × | × |
| Comp. Ex. 3 | Borax | 1000 | CO$_2$ | 6.0 | 151.5 | 34 | 31 | 210 | × | 2.8 | ◯ | × |

TABLE 1-continued

| | | Expansion conditions | | | | Foamed particles | | | Steam pressure | Molded article | |
|---|---|---|---|---|---|---|---|---|---|---|---|
| | Additive | Content of additive (ppm) | Foaming agent | Amount of foaming agent (parts by weight) | Foaming temp. (° C.) | Equilibrium vapor pressure (kgf/cm²G) | Expansion ratio | Average cell diameter (µm) | Uniformity of cells | upon molding (kgf/cm²G) | Dimensional stability | Uniformity of appearance |
| Comp. Ex. 4 | Borax | 2000 | CO₂ | 9.0 | 150.0 | 45 | 52 | 150 | × | 2.6 | × | × |
| Comp. Ex. 5 | Aluminum hydroxide | 2000 | Air | — | 153.0 | 40 | 10 | 130 | × | 4.0 | ○ | × |
| Comp. Ex. 6 | Borax | 2000 | Air | — | 153.0 | 40 | 20 | 190 | × | 3.4 | ○ | × |

TABLE 2

| | | Expansion conditions | | | | | |
|---|---|---|---|---|---|---|---|
| | Additive | Content of additive (ppm) | Foaming agent | Amount of foaming agent (parts by weight) | Foaming temp. (° C.) | Equilibrium vapor pressure (kgf/cm²G) | Expansion ratio of primary foamed particles |
| Ex. 8 | Zinc borate | 1000 | CO₂ | 5.0 | 151.5 | 25 | 17 |
| Ex. 9 | Zinc borate | 1000 | CO₂ | 6.0 | 151.0 | 29 | 22 |
| Ex. 10 | Zinc borate | 1000 | CO₂ | 7.0 | 150.5 | 33 | 27 |
| Comp. Ex. 7 | Aluminum hydroxide | 1000 | CO₂ | 8.0 | 150.0 | 38 | 17 |
| Comp. Ex. 8 | Aluminum hydroxide | 1000 | CO₂ | 8.5 | 149.5 | 40 | 21 |
| Comp. Ex. 9 | Borax | 1000 | CO₂ | 4.5 | 151.5 | 22 | 21 |

TABLE 3

| | Two-stage expansion condition | | Secondary foamed particles | | | Steam pressure upon molding (kgf/cm²G) | Molded article | |
|---|---|---|---|---|---|---|---|---|
| | Internal pressure of particles (kgf/cm²G) | Steam pressure (kgf/cm²G) | Expansion ratio | Average cell diameter (µm) | Uniformity of cells | | Dimensional stability | Uniformity of appearance |
| Ex. 8 | 3.0 | 0.5 | 32 | 240 | ○ | 2.8 | ○ | ○ |
| Ex. 9 | 3.5 | 0.8 | 50 | 260 | ○ | 2.6 | ○ | ○ |
| Ex. 10 | 4.0 | 1.2 | 90 | 270 | ○ | 2.6 | ○ | ○ |
| Comp. Ex. 7 | 3.0 | 0.6 | 33 | 220 | × | 3.0 | ○ | × |
| Comp. Ex. 8 | 3.5 | 0.8 | 46 | 180 | × | 2.6 | × | × |
| Comp. Ex. 9 | 3.5 | 0.8 | 44 | 280 | × | 2.8 | × | × |

INDUSTRIAL APPLICABILITY

The foamed particles of the polyolefin resin according to the present invention have a feature that the expansion ratio is high, and the cell diameters are uniform, and are useful as molding materials for producing molded articles of foamed particles, which are excellent in dimensional stability and good in appearance.

The production process of foamed particles according to the present invention permits the easy production of foamed particles of a polyolefin resin, which have a high expansion ratio, by means of, for example, existing production equipments such as autoclaves and extruders.

What is claimed is:

1. Foamed particles comprising uniform size foamed cells of a polyolefin resin as a base resin, said foamed cells having an average cell diameter of 50 to 500 μm, wherein the base resin contains 50–50,000 ppm of a metal salt which is selected from the group consisting of zinc borate and magnesium borate, and wherein the uniform size foamed cells having an average cell diameter smaller than two third the size of the average cell diameter of twenty observed foamed particles are fewer than three among the twenty observed foamed particles.

2. The foamed particles of claim 1 wherein the metal salt comprises zinc borate.

3. The foamed particles of claim 1 wherein the metal salt comprises magnesium borate.

4. Foamed particles comprising uniform size foamed cells of a polyolefin resin as a base resin, said foamed cells having an average cell diameter of 50 to 500 μm, wherein the base resin contains 50 to less than 5,000 ppm of a metal salt which is selected from the group consisting of zinc borate and magnesium borate, and wherein the uniform size foamed cells having an average cell diameter smaller than two third the size of the average cell diameter of twenty observed foamed particles are fewer than three among the twenty observed foamed particles.

5. The foamed particles of claim 4, wherein the polyolefin base resin contains 100 to 2,000 ppm of said metal salt.

6. The foamed particles of claim 4 wherein the metal salt comprises zinc borate.

7. The foamed particles of claim 4 wherein the metal salt comprises magnesium borate.

8. Foamed particles consisting essentially of uniform size foamed cells of a polyolefin resin as a base resin, said foamed cells having an average cell diameter of 50–500 μm, wherein the base resin contains 50–50,000 ppm of zinc borate, and wherein the uniform size foamed cells having an average cell diameter smaller than two thirds the size of the average cell diameter of twenty observed foamed particles are fewer than three among the twenty observed foamed particles.

9. The foamed particles of claim 8 wherein the base resin contains 50 to less than 5,000 ppm of zinc borate.

10. The foamed particles of claim 8 wherein the base resin contains 100 to 2,000 ppm of the zinc borate.

11. An expansion-molded article of a polyolefin resin obtained by molding foamed particles of claim 1.

* * * * *